(12) United States Patent
Siomina et al.

(10) Patent No.: US 8,768,289 B2
(45) Date of Patent: Jul. 1, 2014

(54) SIGNALING SUPPORT ENABLING QOS DISCRIMINATION FOR POSITIONING, LOCATION AND LOCATION-BASED SERVICES IN LTE

(75) Inventors: Iana Siomina, Solna (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 220 days.

(21) Appl. No.: 12/979,469

(22) Filed: Dec. 28, 2010

(65) Prior Publication Data

US 2011/0159893 A1 Jun. 30, 2011

Related U.S. Application Data

(60) Provisional application No. 61/290,553, filed on Dec. 29, 2009.

(51) Int. Cl.
*H04M 11/04* (2006.01)

(52) U.S. Cl.
USPC ............ 455/404.1; 455/423; 455/456.1; 455/404.2; 455/456.5; 455/456.3

(58) Field of Classification Search
USPC ............ 455/404.1, 423, 456.1, 401.1, 456.5, 455/456.3, 456.2, 456.6, 404.2
See application file for complete search history.

(56) References Cited

U.S. PATENT DOCUMENTS

| | | | |
|---|---|---|---|
| 7,069,023 B2 * | 6/2006 | Maanoja et al. ............ | 455/456.1 |
| 7,738,884 B2 * | 6/2010 | Cheung et al. ............. | 455/456.3 |
| 2004/0160909 A1 * | 8/2004 | Sheynblat .................... | 370/328 |
| 2004/0229632 A1 * | 11/2004 | Flynn et al. ................. | 455/456.3 |

(Continued)

FOREIGN PATENT DOCUMENTS

| | | |
|---|---|---|
| JP | 2002199434 A | 7/2002 |
| JP | 2004177330 A | 6/2004 |
| JP | 2011524102 A | 8/2011 |
| WO | 2008/036676 A2 | 3/2008 |

OTHER PUBLICATIONS

3rd Generation Partnership Project. "Report on Location Service feature (LCS) 25.923 V1.0.0." TSG-RAN Working Group 2 (Radio layer 2 and Radio layer 3), TSGR2#4 (99) 362, Berlin, Germany, May 25-28, 1999.

(Continued)

*Primary Examiner* — Khai M Nguyen
(74) *Attorney, Agent, or Firm* — Coats & Bennett, P.L.L.C.

(57) ABSTRACT

One aspect of the present invention extends the number of client and/or service types used in location-based services. The extension provides richer definitions for use in selecting the optimal or otherwise best suited positioning sequences to be used in fulfilling given positioning requests. For example, some types of commercial-related positioning requests are better satisfied with quicker-but-lower-accuracy position determinations, while other types benefit from more-accurate-but-slower position determinations. These and other benefits are provided by extending the type definitions used to identify commercial positioning requests. For example, a UE may be configured to send positioning requests that indicate the extended client or service types. As another example, the network node(s) involved in generating or processing such requests are configured to understand the extended type definitions and/or to map the extended definitions to QoS requirements, or to particular positioning sequences, for requesting that a positioning node carry out that particular positioning sequence.

9 Claims, 7 Drawing Sheets

(56) References Cited

U.S. PATENT DOCUMENTS

| | | | |
|---|---|---|---|
| 2005/0014500 A1* | 1/2005 | Muhonen et al. | 455/433 |
| 2008/0207217 A1* | 8/2008 | Ramanathan et al. | 455/456.1 |
| 2009/0005061 A1* | 1/2009 | Ward et al. | 455/456.1 |
| 2011/0028165 A1 | 2/2011 | Ni | |

OTHER PUBLICATIONS

3rd Generation Partnership Project. 3G TR 25.923, V1.0.0 (Apr. 1999). 3rd Generation Partnership Project (3GPP); Technical Specification Group (TSG) Ran; Working Group 2 (WG2); Report on Location Services (LCS). Apr. 1999.

3rd Generation Partnership Project. 3GPP TS 36.455, V9.0.0 (Dec. 2009). 3rd Generation Partnership Project; Technical Specification Group Radio Access Network; Evolved Universal Terrestrial Radio Access (E-UTRA); LTE Positioning Protocol A (LPPa) (Release 9). Dec. 2009.

3rd Generation Partnership Project. 3GPP TS 36.413, V8.7.0 (Sep. 2009). 3rd Generation Partnership Project; Technical Specification Group Radio Access Network; Evolved Universal Terrestrial Radio Access Network (E-UTRAN); S1 Application Protocol (S1AP) (Release 8). Sep. 2009.

3rd Generation Partnership Project. 3GPP TS 36.355, V2.0.0 (Nov. 2009). 3rd Generation Partnership Project; Technical Specification Group Radio Access Network; Evolved Universal Terrestrial Radio Access (E-UTRA); LTE Positioning Protocol (LPP) (Release 9). Nov. 2009.

3rd Generation Partnership Project. 3GPP TS 36.305, V9.0.0 (Sep. 2009). 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9). Sep. 2009.

3rd Generation Partnership Project. 3GPP TS 29.171, V1.0.0 (Dec. 2009). 3rd Generation Partnership Project; Technical Specification Group Core Network and Terminals Location Services (LCD); LCS Application Protocol (LCS-AP) between the MME and E-SMLC; SLs interface (Release 9). Dec. 2009.

3rd Generation Partnership Project. 3GPP TS 25.413, V9.1.0 (Dec. 2009). 3rd Generation Partnership Project; Technical Specification Group Radio Access Network; UTRAN lu interface Radio Access Network Application Part (RANAP) signalling (Release 9). Dec. 2009.

3rd Generation Partnership Project. 3GPP TS 25.305, V9.0.0 (Dec. 2009). 3rd Generation Partnership Project; Technical Specification Group Radio Access Network; Stage 2 functional specification of User Equipment (UE) positioning in UTRAN (Release 9). Dec. 2009.

3rd Generation Partnership Project. 3GPP TS 23.271, V9.2.0 (Dec. 2009). 3rd Generation Partnership Project; Technical Specification Group Services and System Aspects; Functional stage 2 description of Location Services (LCS) (Release 9). Dec. 2009.

3rd Generation Partnership Project. 3GPP TS 23.032, V9.0.0 (Dec. 2009). 3rd Generation Partnership Project; Technical Specification Group Services and System Aspects; Universal Geographical Area Description (GAD) (Release 9). Dec. 2009.

3rd Generation Partnership Project. 3GPP TS 22.071, V9.0.0 (Dec. 2009). 3rd Generation Partnership Project; Technical Specification Group Services and System Aspects; Location Services (LCS); Service description; Stage 1 (Release 9). Dec. 2009.

* cited by examiner

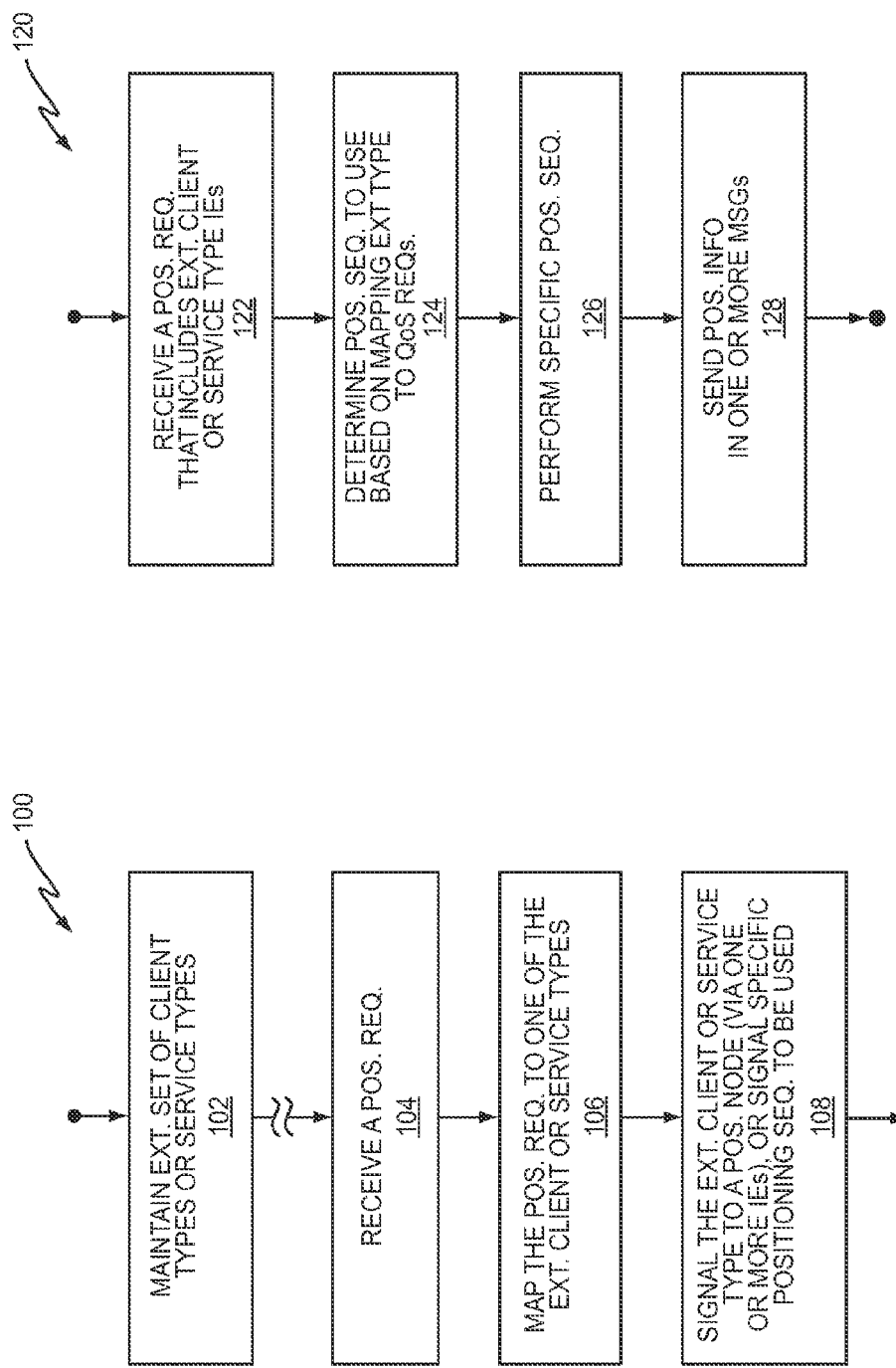

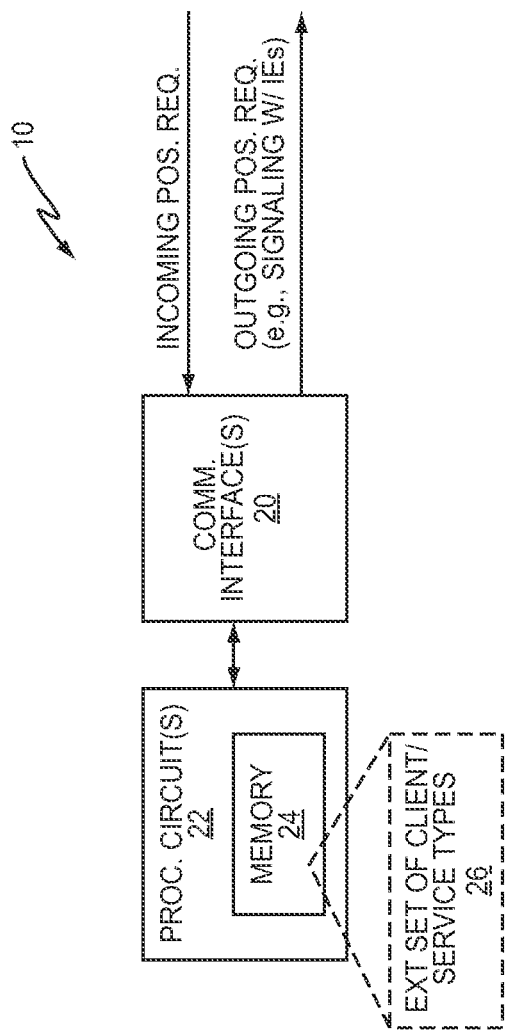
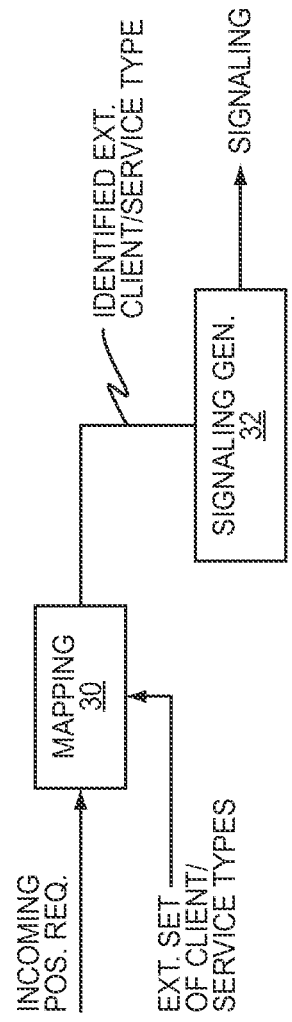

SIGNALING SUPPORT ENABLING QOS DISCRIMINATION FOR POSITIONING, LOCATION AND LOCATION-BASED SERVICES IN LTE

RELATED APPLICATIONS

This application claims priority to U.S. Provisional Application Ser. No. 61/290,553, filed Dec. 29, 2009, and International Application No. PCT/SE2010/050360, filed Mar. 31, 2010, both of which are incorporated herein by reference in their entirety.

TECHNICAL FIELD

The present invention generally relates to positioning within a wireless communication network, such as to support commercial location-based services, and particularly relates to better tailoring the positioning sequences used to the requirements of given positioning requests.

BACKGROUND

Positioning service, location service (LCS) and location-based services (LBS) are becoming more and more important to cellular operators. The introduction of smart phones offers new service possibilities that will require operators to optimize performance, with respect to different positioning requirements for different services, but brings with it new challenges with respect to location services.

In particular, positioning and LCS support for LTE are currently being standardized. Most of the basic signaling support for LCS has been standardized, although work remains. For example, functionality such as LCS QoS (Quality of Service) is not yet complete in the standard. Further, most of the available positioning functionality contemplated in the LTE context has been adopted from UTRAN specifications, even though those specifications are perceived as lacking flexibility and suffering from certain practical problems.

QoS Discrimination in UMTS
LCS QoS Parameters in UMTS

In UMTS, the signalling service between UTRAN or GERAN (in Iu mode) and core network (CN) is provided by the radio network layer signalling protocol called Radio Access Network Application Part (RANAP). At least the following RANAP functions are related to LCS, Controlling location reporting—the function allows the CN to operate the mode in which the UTRAN reports the UE location using message
LOCATION REPORTING CONTROL (transmitted from CN to RNC);
Location reporting—the function used for transferring the actual location information from RNC to the CN using message
LOCATION REPORT;
Location related data—the function allows the CN to either retrieve from the RNC deciphering keys (to be forwarded to the UE) for the broadcast assistance data, or request the RNC to deliver dedicated assistance data to the UE by means of messages:
LOCATION RELATED DATA REQUEST,
LOCATION RELATED DATA RESPONSE, and
LOCATION RELATED DATA FAILURE.

It is specified [8] that a Location service request shall include, among the others, such attributes as LCS Client identity, LCS Client Type, and also, if needed, supported GAD shapes, positioning priority, service identity and/or type, and requested QoS information. In UTRAN, this functionality is enabled by RANAP, so that the LCS Client can request a certain QoS of the positioning functionality available in the RNC of UTRAN (the RNC and its corresponding NodeBs are called the Radio Network Subsystem, or RNS; there can be more than one RNS present in an UTRAN). The requested QoS is defined (at least) by the following information elements of the RANAP LOCATION REPORTING CONTROL message, see [1]:

Response time (values: high/low), which is not mapped to time in the standard;
Accuracy code (encoded with 128 values), which is interpreted as the radius in meters of an uncertainty circle when decoded; and
Vertical accuracy code (encoded with 128 values), which is interpreted as the size of the uncertainty interval, but it is unclear in the standard whether it is one- or two-sided.

Furthermore, the message may also include positioning priority and Client Type (more details in the section that is immediately below).

Client Types in UTRAN

In [8], LCS Client is defined as a software and/or hardware entity that interacts with a LCS Server for the purpose of obtaining location information for one or more UEs. LCS Clients subscribe to LCS in order to obtain location information. LCS Clients may or may not interact with human users. The LCS Client is responsible for formatting and presenting data and managing the user interface (dialogue). The LCS Client may reside in the UE or SUPL-Enabled Terminal (SET), but it could also be at the network side (e.g., network maintenance services or BSs positioning themselves).

The Client Type information is very important in practice since it allows for configuring LCS QoS discrimination in a flexible way. Also, there may exist some restrictions for certain LCS client types. For example, in the US, national interim standard TIA/EIA/IS-J-STD-036 restricts the geographic shape for an emergency services LCS client to minimally either an "ellipsoid point" or an "ellipsoid point with uncertainty circle and confidence" as defined in [7]. In UTRAN, the LCS Client type is signaled in the location reporting control message as one of 8 pre-defined values in UTRAN, said values being used to discriminate between different services. The following Client Type values are supported by UTRAN Iu interface, see [1]:

Emergency Services;
Value Added Services;
PLMN Operator Services;
Lawful Intercept Services;
PLMN Operator Broadcast Services;
PLMN Operator Operation and Maintenance Services;
PLMN Operator Anonymous Statistics Services; and
PLMN Operator Target MS Services Support.

It can be noted that there is only one Client Type for commercial LBS (i.e., Value Added Services)—this single type definition is becoming a significant drawback, as the number of commercial location services increases.

Service Types in UTRAN

Service Type is an attribute of specific LBS that may be provided by the LCS client, as defined in [9]. The LCS Client may also provide the service identity, which can then be mapped by the server to a certain Service Type which may also be verified against the LCS profile and the subscription.

The following LCS categories and types have been standardized [9]:

Public Safety Services (Emergency Services, Emergency Alert Services);

Location Sensitive Charging;

Tracking Services (Person Tracking, Fleet Management, Asset Management);

Traffic Monitoring (Traffic Congestion Reporting);

Enhanced Call Routing (Roadside Assistance, Routing to Nearest Commercial Enterprise);

Location Based Information Services (Traffic and public transportation information, City Sightseeing, Localized Advertising, Mobile Yellow Pages, Weather, Asset and Service Finding);

Entertainment and Community Services (Gaming, Find Your Friend, Dating, Chatting, Route Finding, Where-am-I); and Service Provider Specific Services.

Confidence in General

Due to the nature of radio propagation, it is standard to adopt a statistical description of the obtained positions of the terminals. The confidence parameter is then used for description of the statistical error, the confidence being defined as the probability that the terminal is located in the interior of the reported region. The ways the confidence is obtained differ, the reason for this being different statistical models. In A-GPS, the inaccuracy is caused by a combination of pseudorange measurement errors and geometrical effects. Due to the excess measurements, the law of large numbers together with a linearization provides a motivation for the standard Gaussian position error model. For cell ID and TA positioning the error is rather caused by radio coverage effects. Hence a uniform statistical model for the terminal location is used in these cases.

Selection Logic in UTRAN

The UE Positioning function is controlled by means of operator configurable sets of logic for positioning method selection (the notation "positioning method selection algorithm" will be used below). The positioning method selection algorithm takes a number of inputs, including these items:

The Client Type, received in the LOCATION REPORTING CONTROL message [1];

The QoS parameters (Response Time, Accuracy Code and Vertical Accuracy Code), received in the LOCATION REPORTING CONTROL message [1];

The EnabledPositioningFeatures parameter, with augmented range to cover also RTT Positioning—not relevant for the present invention disclosure; and The UE Capability, primarily to reveal the A-GPS capability of the UE—not relevant for the present invention disclosure.

In the first revision of the QoS discriminating positioning feature, three service classes are implemented, with one configurable set of selection logic for each service class. Each service class, except the Emergency Services class which is default, is defined by configured Client Types. There is one dedicated service class for emergency positioning and two service classes for different commercial services.

The logic for each service class allows a first positioning attempt, possibly followed by two re-attempted positioning attempts. The following alternatives are configurable by the operator:

Valid for all service classes:
The typical QoS for each licensed positioning method, including
Typical response time,
Typical Accuracy Code (Horizontal accuracy expressed as a radius),
Typical Vertical Accuracy Code (Vertical accuracy).

Valid for each service class, separately:
A list of Client Types, for which the service class shall be selected.
Note1: A Client Type is only allowed to appear in one service class. Furthermore, no list is needed for the Emergency Services service class, which is the default case.
Note2: Only one Client Type for commercial services is available in UTRAN.

Valid for all positioning attempts.
Selection of post-check of QoS after each positioning attempt. Note that the QoS is not computed unless a postcheck is configured.

First Positioning attempt
An ordered list of selectable positioning methods,
The method with best QoS is selected.

Second positioning attempt:
Hard selection of first re-attempted positioning method, from list of selectable positioning methods.
Note: A positioning method that has already been executed is not executed a second time.

Third positioning attempt:
Hard selection of second re-attempted positioning method, from list of selectable positioning methods.
Note: A positioning method that has already been executed is not executed a second time.

The positioning selection algorithm operates by first checking the Client Type IE that is received in the LOCATION REPORTING CONTROL message. The Client Type will then correspond to the appropriate service class. The positioning method selection algorithm then proceeds by selection of a first positioning method. The selection is QoS-based, and accounts for:

The requested QoS, as received in the LOCATION REPORTING CONTROL message;

The configured (typical) Response Time, Accuracy Code (Horizontal accuracy) and Vertical Accuracy Code (Vertical accuracy), for each of the licensed positioning methods; and The UE Capability and the enabledPositioningFeatures parameter (which determines if the positioning method is turned on in an RNS)—not relevant for the present invention disclosure.

The selection algorithm loops over the whole list of configured possible first positioning methods, and selects the method that best meets the QoS criteria. The precedence of the QoS criteria follows 3GPP, i.e., Response Time, Accuracy Code followed by Vertical Accuracy Code. In case two methods are equally good, the first method of the list of configured possible first positioning methods is selected.

After the first positioning method has been selected (selection of no method is a possibility), the selected positioning method is executed.

If configured, a post check of the achieved accuracy is performed, after which it is determined if the UE Positioning function shall proceed with reporting or re-attempted positioning, depending on the outcome of the test. In case of failure of the selected positioning method, the UE Positioning method also proceeds with re-attempted positioning.

In case the UE Positioning function proceeds with re-attempted positioning, the UE Capability and enabledPositioningFeatures are checked, this time for the positioning method which is configured for the second positioning attempt. If the test is successful, the use case corresponding to the UE state and the selected positioning method is executed. At completion, any configured post check is performed to check the achieved accuracy. If the achieved accuracy fulfils the requested accuracy, the result of the second positioning attempt is reported, otherwise a third positioning attempt is performed. A third positioning attempt is also performed in case the second positioning attempt would fail.

The third attempt operates like the second attempt, with the exception that after completion, no post check needs to be performed. The reason is that there is no fourth attempt in case the achieved QoS would not be good enough. For the same reason, the UE Positioning function reports the result of the positioning attempt that best meets the requested QoS, as received in the LOCATION REPORTING CONTROL message.

QoS Evaluation in UTRAN

The QoS evaluation operates by:
Checking if the response time is below the requested response time;
Calculation of areas of the geographical formats that results from each positioning method, and comparison to the area of a circle with a radius given by the requested horizontal accuracy code; and
Calculation/lookup of the size of the vertical inaccuracy that results from each positioning method, and comparison to the requested vertical (scalar) accuracy, as given by the vertical accuracy code received over the RANAP interface.

Positioning Architecture and Protocols in LTE

In LTE, the basic Evolved Packet System (EPS) architecture consists of two nodes in the user plane, a base station and an Evolved Packet Core (EPC) network Gateway (GW). The node that performs control-plane functionality (MME) is separated from the node that performs bearer-plane functionality (i.e., GW). Signaling service between E-UTRAN and EPC is provided over the S1 interface by means of S1 Application Protocol (S1AP) [2]. The S1 interface between eNodeB and MME is called S1-MME and is utilized in control-plane positioning solutions. SLs interface is standardized between MME and eSMLC with LCS-AP protocol operating over the interface. The S1 interface between eNodeB and Serving GW is called S1-U and it is utilized in user-plane positioning solutions.

The following location-related procedures are defined for S1AP in [2]:
Location Reporting Control, which allows the MME to request the eNodeB to report the current UE location, with message
LOCATION REPORTING CONTROL;
Location Report, by which the eNodeB provides the UE's current location to the MME by using message
LOCATION REPORT;
Location Report Failure Indication, by which eNodeB informs MME that a Location Reporting Control procedure has failed, with message
LOCATION REPORT FAILURE INDICATION.

In [2], LOCATION REPORTING CONTROL message only indicates how the eNodeB shall report to MME and what type of location information (e.g., CSG or TAI). S1AP messages as such do not contain information on the required accuracy, response time, etc. This information is carried by means of LTE Positioning Protocol (LPP) [4], while using S1AP protocol as a transport over the S1-MME interface, so that LPP messages are carried as transparent PDUs over S1-MME.

LPP is a point-to-point protocol used between a location server and a target device in order to position the target device using position-related measurements obtained by one or more reference sources. For LPP messages, a server could, for example, be eSMLC in the control plane or SLP in the user-plane, while a target could be a UE or SET in the control and user planes, respectively. LPP uses RRC as a transport over Uu interface between UE and eSMLC, S1AP over S1 and SLs interface between eNodeB and eSMLC. The following transactions have been specified for LPP,
capability transfer procedure (request/provide messages),
assistance data transfer procedure (request/provide messages),
location information transfer (request/provide messages), etc.

LTE Positioning Protocol Annex (LPPa), see [5], is a protocol between an eNodeB and the eSMLC. The protocol supports the LPPa Location Information Transfer procedures for positioning-related information and LPPa Management procedures not specifically related to LCS.

Depending on the source of the location service request, the procedures flow may differ. That is, the process flow differs depending on whether the LCS request is triggered by the UE, or by the MME or some other EPC LCS entity, or initiated by the eNodeB. In all cases, a location session is invoked by the MME in order to obtain the location of the UE or perform some other location related service such as transferring assistance data to the UE. LPP and LPPa transport are then supported as a part of an LCS session.

In a user-plane solution, SUPL, including the use of LPP over SUPL, takes place as part of the general user-plane protocol stack [6]. SUPL occupies the application layer in the stack, with LPP (or another positioning protocol) transported as another layer above SUPL.

After the LCS session has been established, according to the current standard, the information related to LCS QoS is retrieved during the LPP capability exchange and LPP location information transfer procedures, i.e., after the LCS session has been established.

In the LPP context, capabilities refer to the ability of a target or server to support different position methods defined for LPP, different aspects of a particular position method (e.g., different types of assistance data for A-GNSS) and common features not specific to only one positioning method (e.g., ability to handle multiple LPP transactions). Capability information, among the others, includes methods, velocity types, geographical location types, etc.

Location information request, transmitted optionally, contains at least the following information:
Location information type (estimate preferred, estimate required, measurements required, etc.);
Periodical reporting (amount and reporting interval);
Assistance availability (available assistance information or no server assistance information);
Additional information (may or may not return requested information);
QoS (see details below);
Environment (badArea, notBadArea, mixedArea, etc.);
Location type (a sequence of Boolean indicators for defining location estimates that may be returned by the target with the estimates being one or more of the following locations types: ellipsoidPoint, ellipsoidPointWith- UncertaintyCircle, ellipsoidPointWithUncertaintyEllipse, polygon, ellipsoidPointWithAltitude, ellipsoidPointWithAltitudeAndUncertaintyEllipsoid or ellipsoidArc); and Velocity type (horizontal velocity, horizontal velocity with and without uncertainty, horizontal & vertical velocity with and without uncertainty).

One can note that location information transfer is a bidirectional procedure, i.e., it can be initiated by request from either side, requesting either for measurements or for estimates, when allowed (e.g., some measurement transmissions are only relevant from a target to a server).

The QoS information part of the location information request comprises the following information:
 horizontal accuracy (128 accuracy codes, 100 confidence codes);
 vertical coordinate request (Boolean);
 vertical accuracy (128 accuracy codes, 100 confidence codes);
 response time (a value in range [1, 128] seconds)—the maximum response time as measured between receipt of the Request Location Information and transmission of a Provide Location Information; and
 velocity (Boolean).

SUMMARY

According to one aspect of the present invention, the number of client and/or service types used in location-based services is extended. The extension provides richer definitions for use in selecting the optimal or otherwise best suited positioning sequences to be used in fulfilling given positioning requests. For example, some types of commercial-related positioning requests are better satisfied with quicker-but-lower-accuracy position determinations, while other types benefit from more-accurate-but-slower position determinations. These and other benefits are provided by extending the type definitions used to identify commercial positioning requests, and by configuring the network nodes involved in generating or processing such requests to understand the extended type definitions.

According to another aspect, the invention proposes signaling at least one of the following in a positioning request to the positioning node: the extended client or service type; location QoS criteria that is mapped by the (requesting) node, to the extended client or service type; or a specific positioning sequence that is mapped by the node to the extended client or service type. One such embodiment proposes signaling of a preferred positioning method or sequence. Doing so makes UE-assisted or network-based positioning more flexible and adaptive to the UE demand. Furthermore, the proposed signaling of the underlying statistical error model enhances the measurement quality information communicated between the positioning node and the node being positioned.

Of course, the present invention is not limited by the above brief summary of features and advantages. Those of ordinary skill in the art will appreciate further advantages and features upon reading the following detailed description of various embodiments of the present invention, and upon viewing the accompanying drawings.

BRIEF DESCRIPTION OF THE DRAWINGS

FIG. 2 is a logic flow diagram illustrating one embodiment of position request processing at a Mobility Management Entity (MME) or other network node, based on the use of extended client and/or service types, for improved selection of the particular positioning sequence(s) best suited for fulfilling a positioning request.

FIG. 3 is a logic flow diagram illustrating one embodiment of position request processing at a positioning services node, based on receiving a positioning request identifying extended client and/or service types, for improved selection of the particular positioning sequence(s) best suited for fulfilling the positioning request—i.e., selecting the positioning sequence that is strategically best for the particular extended client and/or service type that is identified in the positioning request.

FIGS. 4 and 5 are block diagrams illustrating example embodiments of the processing circuitry and associated functions at a network node, such as an MME, for generating outgoing positioning requests responsive to incoming positioning requests, based on mapping the incoming requests to an extended set of client and/or service type definitions.

DETAILED DESCRIPTION

Figure 1:
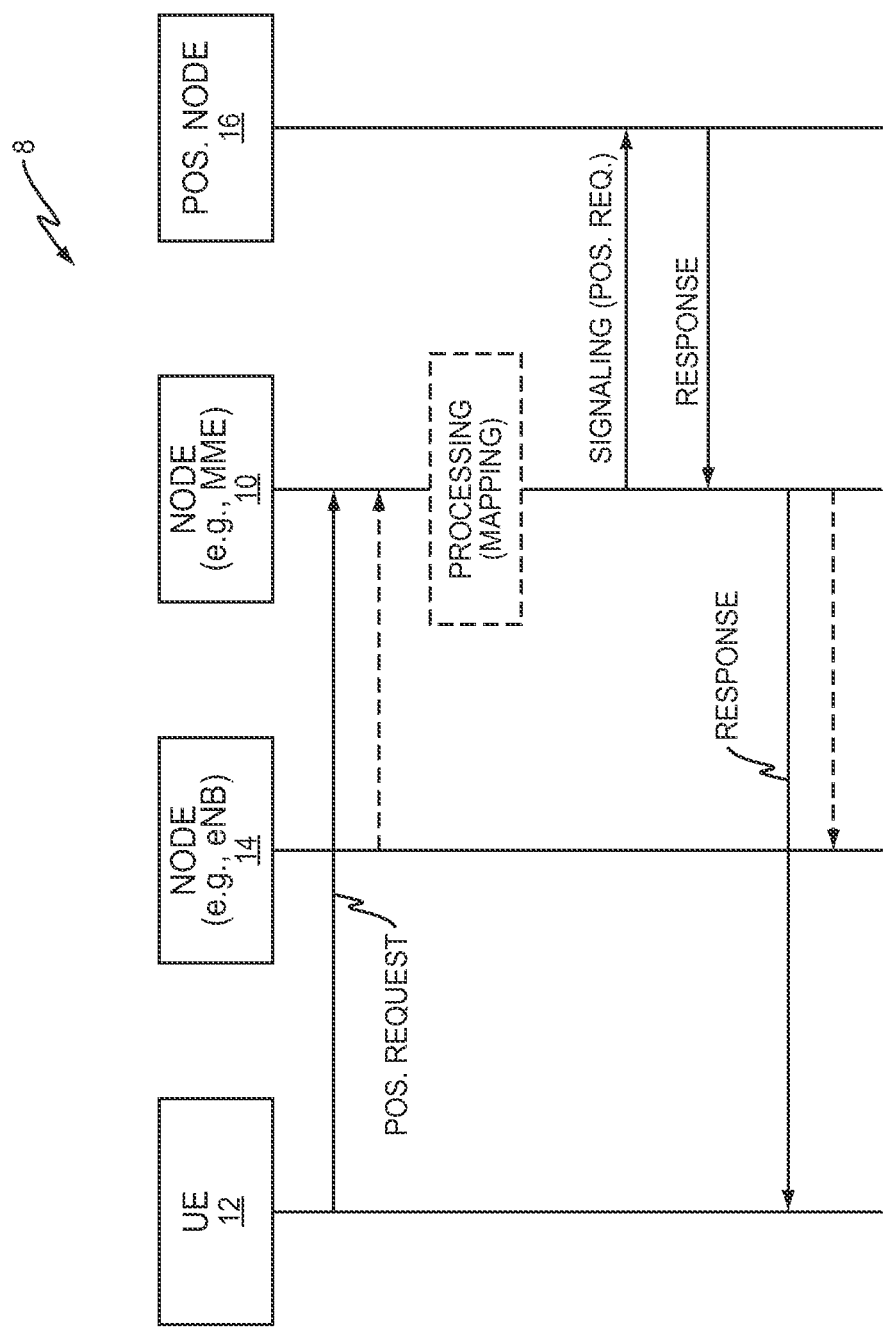
FIG. 1 is a process flow diagram illustrating one embodiment of location-based services, wherein a user terminal (or a network node) originates a positioning request, e.g., in association with a commercial location-based service.

FIG. 1 illustrates a process flow diagram for example positioning services in a wireless communication network 8, wherein a network node 10 (e.g., a Mobility Management Entity or MME in an LTE network) receives a positioning request from a mobile terminal 12 or other item of user equipment (UE). The positioning request generally is received through the Radio Access Network (RAN) node 14 supporting the terminal 12, such as the terminal's supporting eNodeB, in an LTE context. (The request also may originate from, e.g., the eNodeB, as is indicated by the dashed lines.)

According to the teachings herein, the node 10 performs an advantageous mapping of the positioning request, based on its use of an extended set of client and/or service types. Based on that mapping, the node 10 sends signaling (e.g., a corresponding positioning request) to a positioning node 16 that is in the network 8, or is otherwise accessible by the node 10. In particular, in applicable instances, e.g., for commercial-services positioning requests, the node 10 uses its extended set of client and/or service types to provide the positioning node 16 with a more particularized identification of the specific type or nature of commercial services associated with the positioning request.

Doing so allows the positioning node 16 to select the strategically best positioning sequence(s) to use in fulfilling the positioning request. Here, "strategically best" means the positioning sequence or sequence that best matches the practical requirements of the commercial service underlying the positioning request. For example, some location-based commercial services are best served by quick location determinations, even if that speed comes at the expense of accuracy; while location accuracy is paramount in other types of location-based commercial services. Because the location QoS criteria can be particularized for each extended client and/or service type in the extended set of client and/or service types, the particular positioning sequence used by the positioning node can be fine-tuned for any given positioning request. Here, "positioning sequence" connotes the particular positioning operations performed by the positioning node 16, including the basis (GPS, TDOA, etc.) and accuracy used by it for determining location.

With FIG. 1 in mind, FIG. 2 illustrates an example logic flow diagram that may be implemented at the network node 10, which, as noted, may be an MME in an LTE example. The flow diagram depicts a method 100 of providing positioning services in a wireless communication network that includes a positioning node that is configured to provide positioning information for a user equipment (UE) according to a selected positioning sequence. Within the context of the method, a number of different "positioning sequences" are available at the positioning node, offering different positioning response times and/or different positioning QoS. In this context, the method 100 comprises a number of steps, including maintaining at a node in the wireless communication network an extended set of client types or service types corresponding to a plurality of different types of commercial location-based services (Step 102). The different types of commercial location-based services are distinguished in terms of the location QoS criteria. As used herein, the term "location QoS criteria" refers to the indication of particular location QoS requirements and/or the indication of a preferred order of precedence for location QoS parameters (e.g., an indication as to which one(s) of Response Time, Accuracy Code and Vertical Accuracy Code, are deemed to be more important for the particular extended client or service type that is at issue in the positioning request).

The method 100 further includes receiving a positioning request at said node for locating a user equipment (UE) (Step 104) and mapping the positioning request to one of the extended client or service types corresponding to the particular type of commercial location-based service associated with the positioning request (Step 106).

Still further, the method 100 includes signaling the extended client or service type to the positioning node, to trigger selection by the positioning node of a specific one of the positioning sequences available at the positioning node for determining positioning information for the UE (Step 108).

In one or more embodiments, the above method is implemented in an LTE network, e.g., at a eNodeB within an LTE-based wireless communication network.

In the same or other embodiments, the step of maintaining comprises maintaining a set of client types, each corresponding to a different type or category of commercial location service, and further maintaining information for each client type that indicates the location QoS criteria that are associated with the client type.

In the same or other embodiments, the step of mapping comprises evaluating the positioning request and matching it with one of the client types or service types in the extended set, and correspondingly generating one or more information elements to be included in the signaling for the positioning node so that it indicates the location QoS criteria that are associated with the matching client type or service type.

In the same or other embodiments, the mapping step comprises evaluating one or more data items received in or associated with the positioning request, to determine which client or service type from the extended set of client or service types best complements the positioning request. In at least one such embodiment, the MME or other requesting node is configured to signal at least one of the following in a positioning request to the positioning node: the extended client or service type; location QoS criteria that is mapped by the node to the extended client or service type; or a specific positioning method or sequence that is mapped by the node to the extended client or service type. In general, at least the client type may be originally signaled by the Client, which may reside in UE. This means that it is possible that such a request is received at the positioning node from the UE.

Of course, those skilled in the art will appreciate that the present invention contemplates direct and/or indirect links for its various transmitting and receiving steps. For example, a method in a user equipment (UE) comprises maintaining an extended set of client types or service types corresponding to a plurality of different types of commercial location-based services, wherein the different types of commercial location-based services are distinguished in terms of their location QoS criteria, and sending a positioning request associated with a given commercial location-based service. Advantageously, as part of this method, the UE includes in said positioning request an indication of the extended client type or service type corresponding to the given commercial location-based service.

For making use of the above extended signaling, a positioning node must be configured to receive, recognize, and respond to positioning requests received from eNodeBs or other network nodes like the MME, in which the signaled information identifies extended client or service types and/or identifies location QoS criteria or specified positioning sequences. Correspondingly, FIG. 3 illustrates a method 120 of implementing such functionality at a positioning node. The illustrated method 120 includes the step of receiving a positioning request for a given user equipment (UE) or network node as a signaling message that identifies a particular client or service type, as defined in an extended set of client or service types corresponding to a plurality of different types of commercial location-based services (Step 122). As noted, the different types of commercial location-based services are distinguished in terms of location QoS criteria.

The method 120 further includes determining a particular positioning sequence to use for providing positioning information in response to the positioning request, based on mapping the extended client or service type to a specific positioning sequence, as defined for the type of commercial location-based service corresponding to the extended client or service type (Step 124). Still further, the method 120 includes performing the particular positioning sequence to determine said positioning information (Step 126) and sending one or more messages conveying said positioning information (Step 128).

Additionally, in at least one embodiment, the method 120 includes reporting a confidence value in association with sending the one or more messages conveying the positioning information. In at least one such embodiment, the method comprises reporting the type of statistical model on which the confidence value is based, as part of said reporting of the confidence value.

Turning to example apparatus implementations, FIG. 4 depicts a node 10 for use in a wireless communication network that provides positioning services and includes a positioning node that is configured to provide positioning information for a user equipment (UE) according to a selected positioning sequence, wherein different positioning sequences available at the positioning node offer different positioning response times or Quality-of-Service.

The network node 10 comprises one or more communication interfaces 20—e.g., wireless and/or wired interfaces for sending and receiving signals to terminals and/or other network nodes. The node 10 further comprises one or more processing circuits 22—e.g., a microprocessor or other computer-based processing circuit that is at least partially configured to carry out the desired method based on executing computer program instructions stored in a memory 24, or other computer-readable medium that is accessible to the processing circuit(s) 22.

In at least one embodiment, the memory 24 stores a data structure comprising an extended set of client or service types 26. Here, the "or" connotes and/or, meaning that the set may include extended client type definitions for a range of commercial services, and/or may include extended service type definitions for a range of commercial services. Thus, in the illustrated embodiment, the node 10 uses the memory 24 for maintaining an extended set of client types or service types corresponding to a plurality of different types of commercial location-based services. As before, the different types of commercial location-based services are distinguished in terms of location QoS criteria.

Further, the above mentioned communication interface(s) are configured for receiving a positioning request at the node 10, e.g., for locating a user equipment (UE). This request is passed into the one or more processing circuits 22, which are configured to: map the positioning request to one of the extended client or service types corresponding to the particular type of commercial location-based service associated with the positioning request; and signal the extended client or service type to an associated positioning node 16, to trigger selection by the positioning node 16 of a specific one of the positioning sequences available at the positioning node for determining positioning information for the UE.

In at least one embodiment, the node 10 is an MME or other node configured for operation in an LTE network. In the same or other embodiments, the node 10 is configured to maintain the extended set of client types or service types 26 by maintaining a set of client types in the memory 24. Here, each client type corresponds to a different type or category of commercial location service.

The node 10 further maintains information for each client type that indicates the location QoS criteria that are associated with the client type. For example, the associated location QoS criteria may be the QoS requirements and/or order of precedence (for location parameters) that most strategically complements the particular client type. Such associations may be determined, for example, in advance, and included in the node 10 as part of its operational provisioning.

Further, in at least one embodiment, the node 10 is configured to carry out the mapping by evaluating a received positioning request and matching it with one of the client types or service types in the extended set 26, and correspondingly generating one or more information elements (IEs) to be included in the signaling for the positioning node 16.

FIG. 5 illustrates a non-limiting example of this embodiment, wherein a mapping function 30 within the processing circuits 22 maps incoming positioning requests to particular client/service types in the extended set 26. Correspondingly, a signaling generator 32 generates the IEs or other information that will be used to form the positioning request message sent to the positioning node 16.

Figure 6:
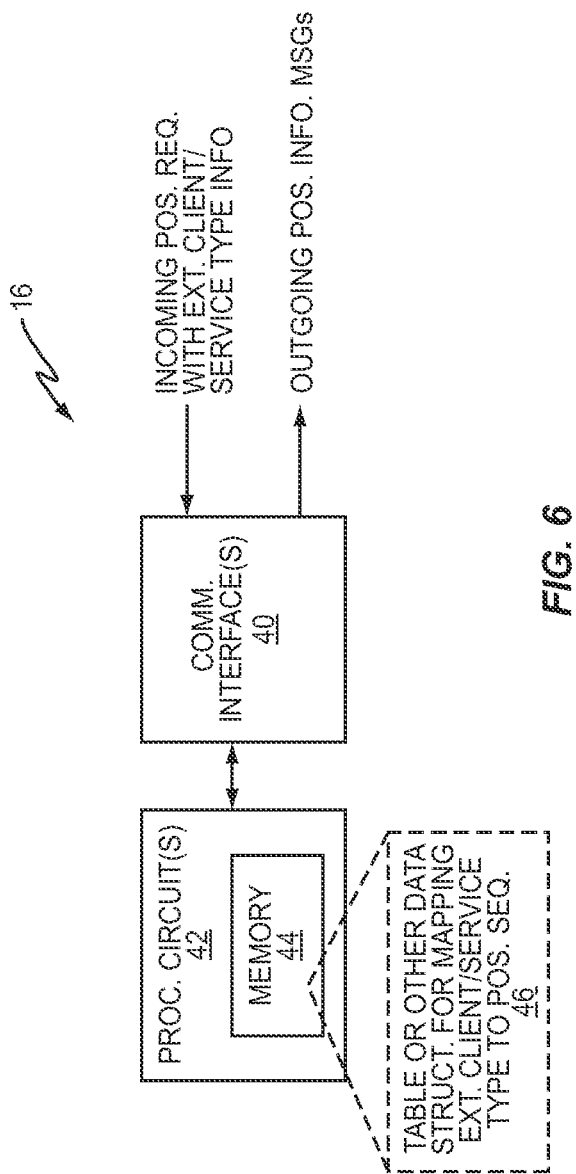
FIGS. 6 and 7 are block diagrams illustrating example embodiments of the processing circuitry and associated functions at a positioning node, for mapping the extended client and/or service type information received in a given positioning request to the strategically best positioning sequence(s).

In this manner, the one or more IEs or other included message data indicate the location QoS criteria that are associated with the matching client type or service type. The positioning node 16 uses that extended signaling to choose the appropriate positioning sequence to be used for generating positioning information in accordance with the request. FIG. 6 provides an example of such a positioning node 16.

The illustrated embodiment of the positioning node 16 is configured for processing positioning requests in a wireless communication network 8 that is configured to provide location services for user equipment (UE) 12. The positioning node 16 comprises a communications interface 40 for receiving a positioning request for a given user equipment (UE) or network node as a signaling message that identifies a particular client or service type, as defined in an extended set of client or service types corresponding to a plurality of different types of commercial location-based services. Here, the different types of commercial location-based services are distinguished in terms of location QoS criteria.

The positioning node 16 further includes one or more processing circuits 42, such as microprocessors and/or other digital processing circuits, configured to determine a particular positioning sequence to use for providing positioning information in response to the positioning request. The circuit or circuits make the determination based on mapping the extended client or service type to a specific positioning sequence, as defined for the type of commercial location-based service corresponding to the extended client or service type. The circuit or circuits are further configured to perform the particular positioning sequence, to determine said positioning information and send one or more messages conveying said positioning information.

In at least one embodiment, the processing circuits 42 include or are associated with one or more memory circuits or other computer readable media 44. In particular, the memory 44 is configured to store data, e.g., a table or other data structure 46, that embodies the mapping of extended client or service type information to one or more particular positioning sequences. See FIG. 7, which depicts an example of such processing, wherein certain functional elements within the processing node 16 are depicted as carrying out the mapping, positioning, and messaging.

Figure 7:
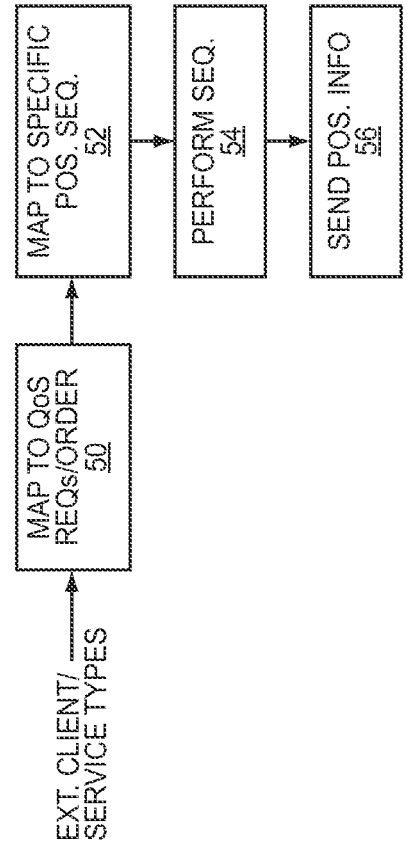

In particular, FIG. 7 depicts a mapping function 50 that takes the extended client or service type information included in the positioning request as received at the positioning node, and maps it to location QoS requirements and/or to an order of precedence for given location QoS parameters. In turn, that information is mapped to one or more specific positioning sequences—i.e., specific positioning actions, such as GPS, TDOA, etc.—at the positioning node 16 by a second mapping function 52. Further, one or more functions 54 implemented in the positioning node 16 perform the specific positioning sequence(s), and a further function, e.g., a communication/signaling function 56, sends the resultant positioning request response.

Further, in at least one embodiment, the positioning node 16 is further configured to report a confidence value in association with sending the one or more messages conveying the positioning information. In at least one such embodiment, the positioning node 16 is configured to report the type of statistical model on which the confidence value is based, as part of said reporting of the confidence value.

Figure 8:
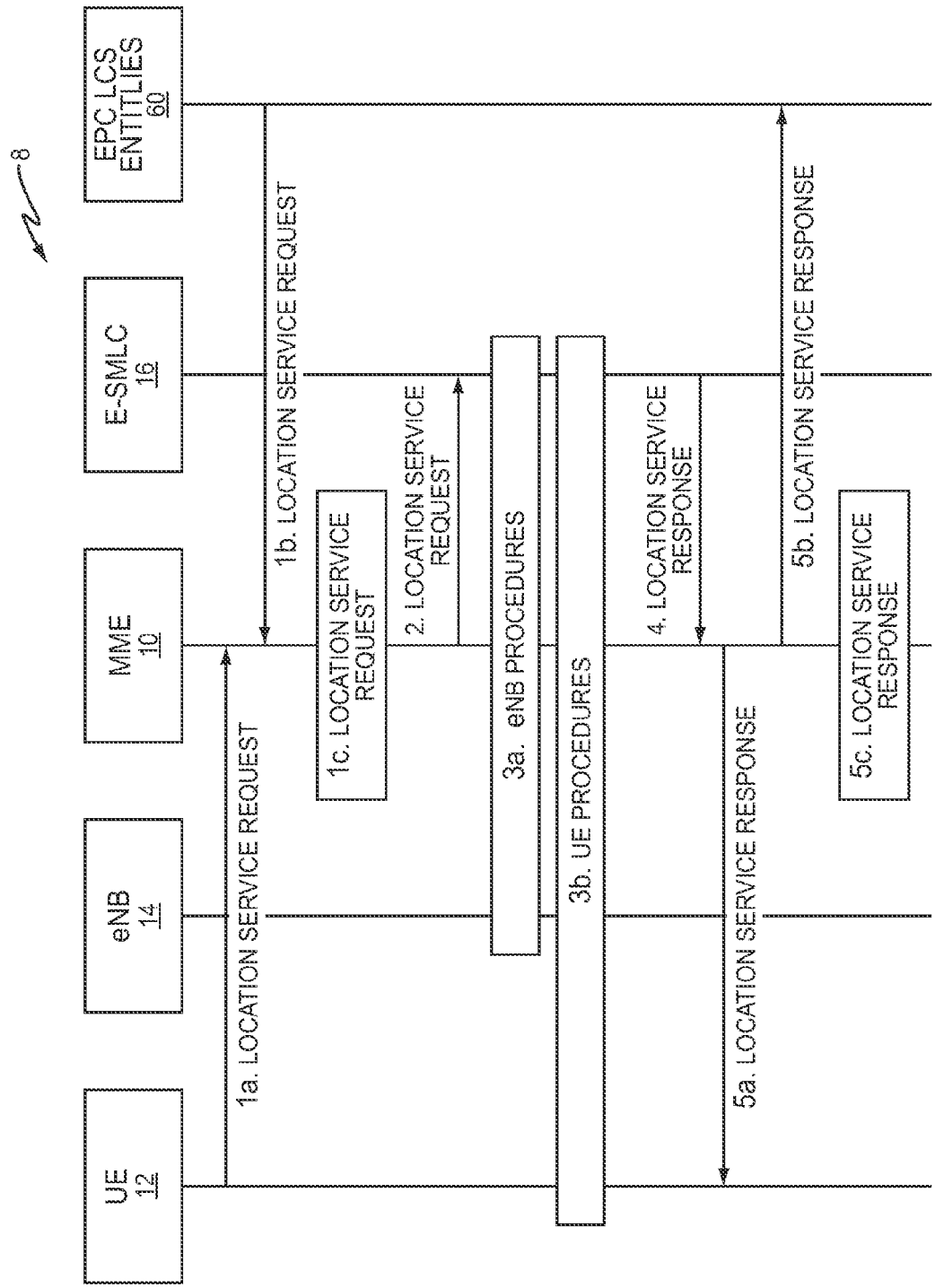
FIGS. 8 and 9 are process flow diagrams illustrating embodiments of location-based services in the LTE context, wherein a user terminal (FIG. 8) or another network node (FIG. 9) originates a positioning request, e.g., in association with a commercial location-based service.

FIG. 8 provides an example of positioning request processing as contemplated herein, wherein the wireless communication network 8 is implemented as an LTE network, and the node 10 comprises an MME in the example network. The node 10 receives a positioning request directly or indirectly from a given UE 12 (Step 1a), or from a location-services entity 60 (Step 1b), which may be a third-party commercial entity, for example. Or the MME initiates a positioning request, such as may be needed for a given network management function (Step 1c). In any case, the node 10 carries out location services request processing, and correspondingly sends the positioning node 16 (here, an E-SMLC) a positioning request message that includes extended client or service type information (Step 2).

Following associated eNodeB processing (Step 3a) and certain UE procedures (Step 3b), the positioning node 16 returns a location service response message (Step 4), wherein the returned positioning information was obtained by the positioning node according to the mapping of extended client/service type information to the best matching or most appropriate positioning sequence at the positioning node 16. The node 10 sends a corresponding location service response message to the UE 12 (Step 5a) and/or returns a location service response to the third party entity (Step 5b), as part of associated location service response processing (Step 5c).

Figure 9:
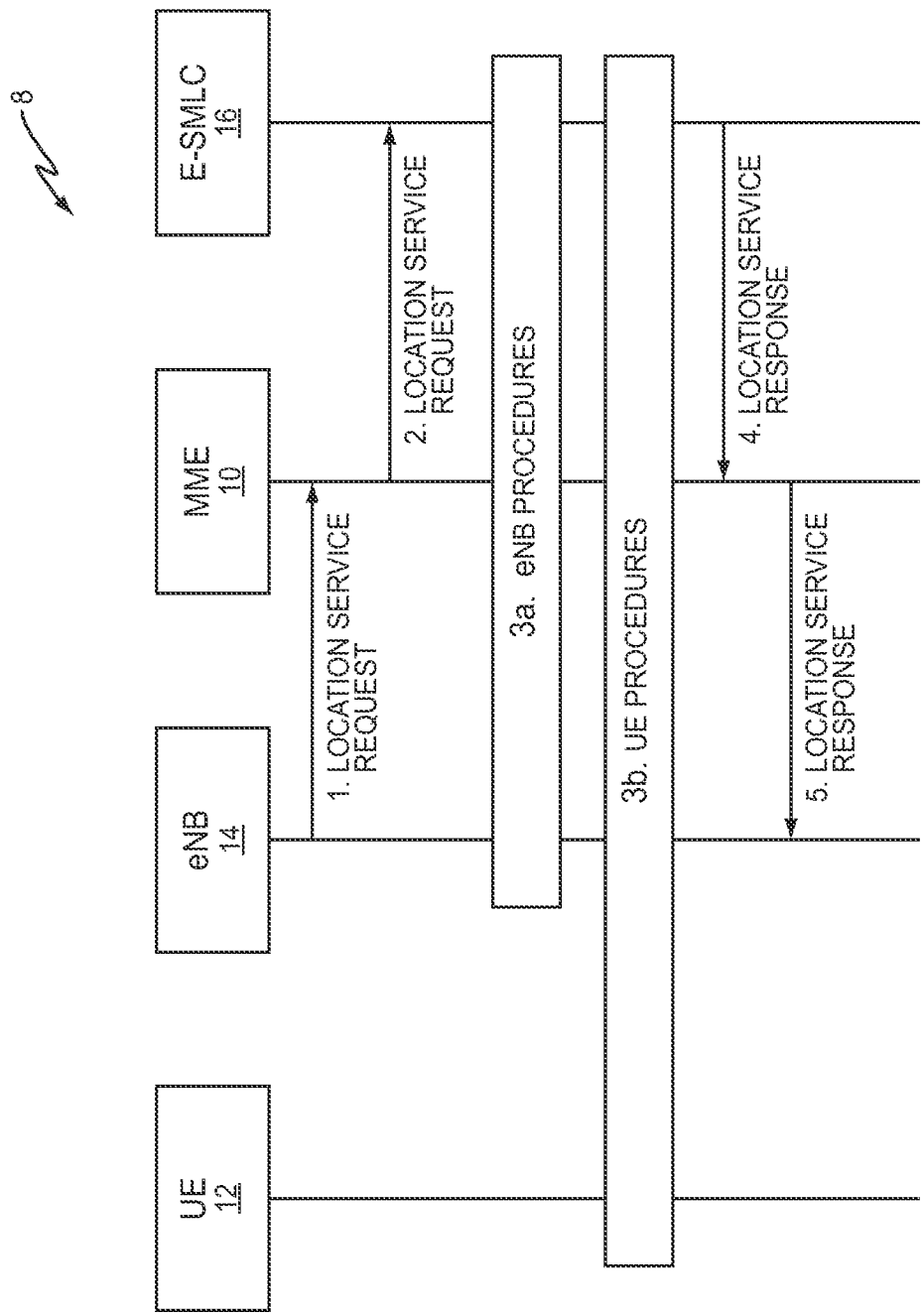

FIG. 9 illustrates similar processing, but where the positioning request originates from another node in the network, here an eNodeB 14. Again, as was the case with the processing illustrated in FIG. 8, the MME uses extended client or service type information, to enable the positioning node 16 (again, an E-SMLC in the diagram), to use the extended information to select the particular positioning sequence or sequences that best suits the nature of the commercial service giving rise to the positioning request.

Figure 10:
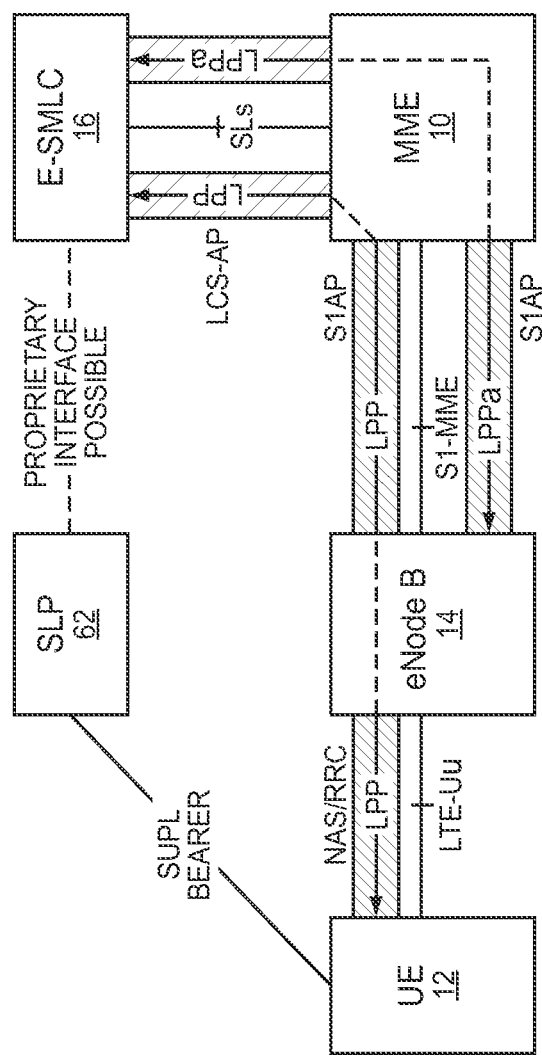
FIG. 10 is a block diagram of one embodiment of nodes and interfaces involved in positioning services in the context of an LTE network, and it particularly depicts example interfaces and protocols used between the involved nodes in an LTE context.

Further, FIG. 10 illustrates an example LTE architecture that is reminiscent of E-UTRAN implementations—an MME 10, a UE 12, an eNodeB 14, an E-SMLC 16, and an SLP 62 are illustrated. Unlike E-UTRAN, however, here the MME is configured to include extended client or service type information in positioning request messages that it sends to the E-SMLC. Further, the E-SMLC is configured to use that extended information to select the best or most appropriate positioning sequence to use for the particularized location QoS criteria that are associated with the extended client or service type.

For example, in at least one embodiment taught herein, a method of providing positioning services in a wireless communication network comprises extending the UTRAN 8 "Client Types," to include an extended set (or a subset) of Value Added Services types. That is, according to the current UTRAN 8 Client Type definitions there is only one type designation for Value Added Services, which broadly covers many types of commercial positioning and location-based services. In one embodiment proposed herein, the definition of Value Added services is made richer, by extending the defined Client Types to include Value Added Service 1 through N, where N can be, e.g., 8, 16, or 32.

With these more refined Value Added Services type definitions, the particular positioning sequence or method used can be tailored to the particular Value Added Services type involved. As a non-limiting example, it may be that fast, but only moderately accurate positioning is most beneficial for a particular Value Added Services type, while accurate positioning is more appropriate for another type of Value Added Service, even if obtaining the more accurate positioning fix takes longer. One or more nodes in the network can be configured to map individual ones of these extended types of Value Added Services to the most appropriate positioning sequence, method, or protocol, meaning that the positioning processing done for a given positioning request associated with Value Added Services can be tailored to the particular type of commercial service involved in the request.

With the above example embodiments in mind, the current invention in one or more embodiments proposes an extension to the signaling support for positioning in LTE. In so doing, the invention enhances the available LCS QoS functionality of LTE, and provides LTE with location-based service support that is more flexible than what has been known to date, e.g., in UMTS, and further provides a rich and robust basis for supporting the burgeoning development of location-based services in LTE and other newer networks. As such, the present invention addresses the above needs, goes beyond what is available in UMTS, and defines signaling methods, including protocol extensions and associated processing apparatuses. In so doing, in an LTE context, the present invention defines advantageous signaling between LCS Client and eSMLC, for flexible and future-proof location-based services support in LTE.

In part, one or more embodiments of the invention involve: signaling the type of service from the end user to the positioning node of the LTE system, this normally being the eSMLC; signaling the requested QoS from the end user to the positioning node of the LTE system, this normally being the eSMLC; selecting a sequence of positioning attempts, to meet said requested QoS of said positioning service; selecting shape conversion, to meet reporting requirements of said positioning service; and evaluating the achieved QoS of said selected positioning attempts of said selected sequence.

Correspondingly, the present invention offers a number of advantages, including but not limited to these items: the number of Client Types is extended—for example, unlike the prior art, one or more embodiments of the invention proposed herein provide an extended list of Client Types, including definitions for different types of Value Added Services, so that the location processing selected or otherwise provided for a given Value Added service can be more effectively tailored to the needs of that service; extended signaling for extended client types and/or service types or service identities is specified for use in the LTE standard; advantageous and unambiguous handling and signaling of confidence is provided—further, the teachings herein extend the available signaling, for identifying the underlying statistical model (uniform or Gaussian) associated with the confidence determination, a fact that is important when addressing QoS; signaling is extended in a manner that makes it possible to indicate or otherwise select a preferred specific positioning method, where such indications were not possible in the signaling defined in prior art; and signaling is extended to indicate the precedence of the requested QoS, e.g., for a given positioning request, indicating which of the response time, accuracy code and vertical accuracy code is most important.

In implementing such functionality within LTE, the present invention introduces the signaling of Client Types, at least for a subset of the signaling chains from the end user client to the eSMLC. Referencing FIGS. 8 and 9, one notes that such information can be requested from a target UE 12 (or other device to be positioned) and transmitted by means of LPP together with other service-specific QoS parameters in the LPP Location Information Request message. It is further suggested that the LTE standards be augmented with the Client Types such as Value Added Services 1, Value Added Services 2, . . . , Value Added Services N, where these service classes are intended for commercial LBS of various kinds. Suitable values for N could be 8, 16 or 32. Implementation could be performed by means of a list. (Alternatively, one could introduce LQCI (LCS QCI, or QoS Class Identifier; note: "QCI" is used for normal LTE services to denote a pre-defined configuration) and these could be just unsigned integers in range 0 . . . N−1.)

As is appreciated, the (location) QoS information needs to be known to the positioning node (eSMLC). In prior-art solutions, the LCS QoS information is typically retrieved before the LCS session is established. In LTE, it is possible to send the Client Type information in the Location request message over SLs interface to eSMLC [10], assuming this information is already available in the MME. Otherwise, the information needs to be delivered to MME from a UE (e.g., over LTE-Uu and S1 interfaces in NAS message), eNodeB (e.g., over S1 interface in S1AP message) or LCS entity, depending on where the Location request is originating from.

Further, according to [10], for example, UE positioning capability or QoS information may also be transmitted in the Location request message. However, if the eSMLC does not receive this information, the eSMLC may request the capability information through LPP as defined in [4]. While the existing LTE standards do not describe such a possibility for requesting, for example, Client Type, such functionality is proposed and provided for herein. Either (or both) control-plane and user-plane signaling solutions are contemplated. As a generalized solution, it is proposed that there exists a Client Type transfer possibility to the positioning node from an entity that can decide or has the information about the Client Type (e.g., from eNodeB over LPPa, from UE over LPP, other LCS entity, etc). In yet another embodiment, the eSMLC receives the Client Type information via user plane, e.g., transmitted from SET to SLP (by SUPL) and then to eSMLC (by LIp). Still further, in one embodiment, a certain set of pre-configured parameters and sequence of positioning methods for an LCS session is associated with each Client Type. The set of parameters can either be stored in a database in eSMLC and provided by manufacturer or can be configured by the operator.

Additionally, while service identity and service types are not yet in the LTE standard (see [10]), the present invention proposes methods and apparatuses for signaling such information to the eSMLC. Further, the present invention contemplates and provides for signaling the preferred positioning method, for any given positioning request. It is suggested that the standard location-related LTE signaling be augmented with a signaling field indicating the preferred positioning method. Values would need to include A-GNSS (covering all variants of UE assisted/UE based), OTDOA, Fingerprinting, ECID, cell ID and reserves. Thirty-two (32) values (5 bits) are believed to be sufficient for encoding. As a non-limiting proposal, such information may be signaled the same as or similar to the Client Type signaling, e.g., the eSMLC should be able to retrieve this information from the entity that has this information (e.g., LCS Client or MME if the information is associated with a subscription).

As a further advantageous signaling enhancement, the present invention contemplates signaling (by a positioning node) the underlying statistical error model for confidence estimation. In one embodiment, such signaling is implemented using an error model indicator. For example, the indicator is a 1-bit Boolean field optionally transmitted with LPP in the Location Information response message such that when not transmitted, the uniform model shall be assumed, otherwise "0" shall be used to indicate Gaussian error model and "1" is reserved. In another embodiment, more than one bit is used for indicating the model information; however, two bits generally should be sufficient for such signaling.

Whether or not such signaling enhancements are implemented, those skilled in the art will appreciate that one or more embodiments presented herein map a (commercial) positioning request to an extended client or service type in an extended set of client or service types. Each such extended client or service type is associated with location QoS criteria.

Thus, a UE or network node (e.g., an MME) may be configured to map a given commercial location request to a particular one of the extended client or service types in the extended set, and signal that mapping to a positioning node in the network, which is configured to map the extended client/service type to given location QoS criteria, and correspondingly to perform the positioning sequence best suited to satisfying the location QoS criteria. Note, too, that in one or more embodiments a network node, such as an MME, can be configured to perform the service-type-to-positioning-sequence mapping, such that the MME or other node signals a specific positioning sequence to be used by a positioning node, as part of sending a positioning request to the positioning node. In such embodiments, the positioning request received at the positioning node identifies the particular positioning sequence to be used by the positioning node, and the positioning node is correspondingly configured to perform the particular positioning sequence identified in the request.

Further the node may be configured to carry out said mapping of the positioning request by evaluating the positioning request and matching it with one of the client types or service types in the extended set, and correspondingly generating one or more information elements to be included in the signaling for the positioning node so that said signaling indicates the location QoS criteria that are associated with the matching client type or service type.

Thus, one or more embodiments of the present invention provide a method of providing positioning services in a wireless communication network that includes a positioning node that is configured to provide positioning information for a user equipment (UE) according to a selected positioning sequence, wherein different positioning sequences available at the positioning node best complement different location Quality-of-Service (QoS) criteria. That is, as a general proposition, a particular one of the positioning sequences available at the positioning node best meets the particular location QoS criteria associated with the positioning request. In at least one such embodiment, the method includes maintaining at a node in the wireless communication network an extended set of client types or service types corresponding to a plurality of different types of commercial location-based services, wherein the different types of commercial location-based services are distinguished in terms of their location QoS criteria.

The method further includes receiving a positioning request at said node for locating a user equipment (UE), mapping the positioning request to one of the extended client or service types corresponding to the particular type of commercial location-based service associated with the positioning request, and signaling the extended client or service type, or the associated location QoS criteria, to the positioning node. That signaling is done to trigger selection by the positioning node of a specific one of the positioning sequences available at the positioning node for determining positioning information for the UE. Alternatively, rather than signaling the extended type information, or the location QoS criteria corresponding to that extended type information, the method includes mapping the extended client or service type to a specific positioning sequence and signaling the specific positioning sequence to the positioning node, to request that the positioning node execute the specific positioning sequence.

Further, the present invention provides a method of processing positioning requests at a positioning node in a wireless communication network that is configured to provide location services for a user equipment (UE). In at least one embodiment, the method includes receiving a positioning request for a given user equipment (UE) or network node as a signaling message. The method further includes determining a particular positioning sequence to use for providing positioning information in response to the positioning request.

That determination is based on determining the particular positioning sequence from signaling in the positioning request that identifies the particular positioning sequence. Alternatively, the positioning request does not identify the particular positioning sequence, but instead carries information signaling the location QoS criteria associated with the extended client or service type at issue in the request, or carries information signaling extended client or service type. Thus, according to this alternative, the determination of which particular positioning sequence to use is based on mapping information signaled in the positioning request to a particular positioning sequence available at the positioning node. If the signaled information comprises an extended client or service type, the positioning node maps that information to a corresponding location QoS criteria, which it then maps to the particular positioning sequence. If the signaled information comprises location QoS criteria, the positioning node maps it to the particular positioning sequence.

In any case, the method includes performing the particular positioning sequence, to determine said positioning information. Finally, the method includes sending one or more messages conveying said positioning information.

With the above signaling options and variations in mind, those skilled in the art will appreciate that the present invention provides enhanced positioning flexibility compared to earlier systems, e.g., a range of LCS Client Types. Further, those skilled in the art will appreciate that the foregoing description and accompany drawings are not limiting. Instead, the present invention is limited only by the presented claims and their legal equivalents.

ABBREVIATIONS

A-GNSS Assisted Global Navigation Satellite System
CN Core Network
CSG Closed Subscriber Group
E-CID Enhanced Cell ID
E-UTRAN Evolved UTRAN
EPC Evolved Packet Core
EPS Evolved Packet System
eSMLC Evolved Serving Mobile Location Centre
IE Information Element
LBS Location-Based Service
LCS LoCation Service
LCS-AP LCS Application Protocol
LPP LTE Positioning Protocol
LPPa LTE Positioning Protocol Annex
LTE Long-Term Evolution
MME Mobility Management Entity
NAS Non-Access Stratum
OTDOA Observed Time Difference of Arrival
PDU Packet Data Unit
QoS Quality of Service
RANAP Radio Access Network Application Part
RNC Radio Network Controller
RNS Radio Network Subsystem
RRC Radio Resource Control
S1AP S1 Application Protocol
SET SUPL Enabled Terminal
SLP SUPL Location Platform
SUPL Secure User Plane Location
TAI Tracking Area Identity
UE User Equipment
UMTS Universal Mobile Telecommunications System
UTRA UMTS Terrestrial Radio Access
UTRAN UMTS Terrestrial Radio Access Network

REFERENCES

[1] 3GPP, TS 25.413, "UTRAN Iu interface RANAP signalling", available at http://www.3gpp.org.
[2] 3GPP, TS 36.413, V9.0.0, "Evolved Universal Terrestrial Radio Access Network (E-UTRAN); S1 Application Protocol (S1AP)". September 2009.
[3] 3GPP, TS 25.305, "Stage 2 functional specification of UE positioning in UTRAN".
[4] 3GPP 36.355, "Evolved Universal Terrestrial Radio Access (E-UTRA); E-UTRA, LTE Positioning Protocol (LPP)", December 2009.
[5] 3GPP 36.455, V2.0.0 "Evolved Universal Terrestrial Radio Access (E-UTRA); LTE Positioning Protocol A (LPPa)", December 2009.
[6] 3GPP 36.305, "Evolved Universal Terrestrial Radio Access (E-UTRA); Stage 2 functional specification of User Equipment (UE) positioning in E-UTRAN".
[7] 3GPP TS 23.032, "Universal Geographical Area Description (GAD)".
[8] 3GPP TS 23.271, "Functional Stage 2 Description of Location Services (LCS)".
[9] 3GPP TS 22.071, "Location Services (LCS); Service description; Stage 1".
[10] 3GPP TS 29.171 v1.0.0, "LCS Application Protocol (LCS-AP) between the MME and E-SMLC; SLs interface", December 2009.

What is claimed is:

1. A method of providing positioning services in a wireless communication network that includes a positioning node that is configured to provide positioning information for a user equipment (UE) according to a selected positioning sequence, wherein different positioning sequences available at the positioning node offer different positioning response times or Quality-of-Service (QoS), wherein said method comprises:
maintaining at a first node in the wireless communication network an extended set of client types or service types corresponding to a plurality of different types of commercial location-based services, wherein the different types of commercial location-based services are distinguished in terms of their location QoS criteria;
receiving a positioning request at said first node for locating a UE;
mapping the positioning request to one of the extended client or service types corresponding to the particular type of commercial location-based service associated with the positioning request; and
signaling at least one of the following in a positioning request to the positioning node: the extended client or service type, or a specific positioning sequence that is mapped by the first node to the extended client or service type;
wherein the first node and the positioning node are different nodes.

2. The method of claim 1, wherein the wireless communication network comprises a Long Term Evolution (LTE) network, an LTE-Advanced network, or a Universal Mobile Telecommunications System (UMTS) network.

3. The method of claim 1, wherein maintaining the extended set of client types or service types comprises maintaining a set of client types, each corresponding to a different type or category of commercial location service, and further maintaining information for each client type that indicates, as said location QoS criteria, at least one of the following for the client type: location QoS requirements that are associated with the client type; and an order of precedence for QoS parameters that is associated with the client type.

4. The method of claim 1, wherein said mapping of the positioning request comprises evaluating the positioning request and matching it with one of the client types or service types in the extended set, and correspondingly generating one or more information elements to be included in the signaling for the positioning node so that said signaling indicates the location QoS criteria that are associated with the matching client type or service type.

5. The method of claim 1, wherein said mapping of the positioning request comprises evaluating one or more data items received in or associated with the positioning request, to determine which client or service type from the extended set of client or service types best complements the positioning request.

6. A first node for use in a wireless communication network that provides positioning services and includes a positioning node that is configured to provide positioning information for a user equipment (UE) according to a selected positioning sequence, wherein different positioning sequences available at the positioning node offer different positioning response times or Quality-of-Service (QoS), wherein said first node comprises:
    memory for maintaining an extended set of client types or service types corresponding to a plurality of different types of commercial location-based services, wherein the different types of commercial location-based services are distinguished in terms of their location QoS criteria;
    a communication interface for receiving a positioning request at said first node for locating a UE; and
    one or more processing circuits configured to:
        map the positioning request to one of the extended client or service types corresponding to the particular type of commercial location-based service associated with the positioning request; and
        signal at least one of the following in a positioning request to the positioning node: the extended client or service type, or a specific positioning sequence that is mapped by the first node to the extended client or service type;
    wherein the first node and the positioning node are different nodes.

7. The first node of claim 6, wherein the wireless communication network comprises a Long Term Evolution (LTE) network, an LTE-Advanced network, or a Universal Mobile Telecommunications System (UMTS) network.

8. The first node of claim 6, wherein the first node is configured to maintain the extended set of client types or service types by maintaining a set of client types in said memory, each client type corresponding to a different type or category of commercial location service, and further by maintaining information, as said location QoS criteria, for each client type that indicates at least one of the following for each client type: the location QoS requirements that are associated with the client type; and the order of precedence for QoS parameters that is associated with the client type.

9. The first node of claim 6, wherein the first node is configured to carry out said mapping of the positioning request by evaluating the positioning request and matching it with one of the client types or service types in the extended set, and correspondingly generating one or more information elements to be included in the signaling for the positioning node so that said signaling indicates the location QoS criteria that are associated with the matching client type or service type.

* * * * *

UNITED STATES PATENT AND TRADEMARK OFFICE
CERTIFICATE OF CORRECTION

PATENT NO.         : 8,768,289 B2                                           Page 1 of 1
APPLICATION NO.    : 12/979469
DATED              : July 1, 2014
INVENTOR(S)        : Siomina et al.

It is certified that error appears in the above-identified patent and that said Letters Patent is hereby corrected as shown below:

On the Title Page

Insert Item -- (30) Foreign Application Priority Data Mar. 31, 2010
(SE).......................PCT/SE2010/050360 --.

In the Figure, in Box "60", Line 2, delete "ENTITLIES" and insert -- ENTITIES --, therefor.

On Page 2, in Item (56), under "OTHER PUBLICATIONS", in Column 2, Line 12, delete "lu" and insert -- Iu --, therefor.

In the Drawings

In Fig. 8, Sheet 5 of 7, in Box "60", delete "ENTITLIES" and insert -- ENTITIES --, therefor.

Signed and Sealed this
Twenty-fourth Day of March, 2015

Michelle K. Lee
*Director of the United States Patent and Trademark Office*